United States Patent [19]

Tani et al.

[11] Patent Number: 4,921,376

[45] Date of Patent: May 1, 1990

[54] ARBOR FOR MOUNTING A TOOL TO A SPINDLE OF A MACHINE TOOL AND A MACHINING METHOD OF EMPLOYING THE SAME

[75] Inventors: Naohiko Tani, Nagoya; Masahiro Kouda, Gifu; Atsushi Ito, Owariasahi; Yuji Miwa, Chita, all of Japan

[73] Assignee: Brother Kogyo Kabushiki Kaisha, Japan

[21] Appl. No.: 343,280

[22] Filed: Apr. 26, 1989

[30] Foreign Application Priority Data

Apr. 28, 1988 [JP] Japan ................................. 63-105695
Oct. 5, 1988 [JP] Japan ................................. 63-251364

[51] Int. Cl.⁵ ............................................. B23B 27/10
[52] U.S. Cl. ...................................... 409/131; 408/57; 408/59; 409/136
[58] Field of Search .............................. 408/56, 57, 59; 4509/135, 136, 231, 131; 51/266, 356; 279/20

[56] References Cited

U.S. PATENT DOCUMENTS

| | | | |
|---|---|---|---|
| 2,867,140 | 1/1959 | Getts | 408/57 |
| 3,568,367 | 3/1971 | Myers | 408/57 |
| 3,893,355 | 7/1975 | Masstricht | 279/1 TS |
| 4,080,090 | 3/1978 | Kern | 408/59 |
| 4,557,643 | 12/1985 | Cioci | 408/56 |
| 4,642,005 | 2/1987 | Kondo et al. | 408/56 |
| 4,787,785 | 11/1988 | Miller et al. | 409/136 |

FOREIGN PATENT DOCUMENTS

| | | | |
|---|---|---|---|
| 72657 | 2/1983 | European Pat. Off. | 408/57 |
| 52-8286 | 7/1975 | Japan . | |
| 51-45579 | 11/1976 | Japan . | |
| 54-10615 | 5/1979 | Japan . | |
| 61-134844 | 8/1986 | Japan . | |
| 63-57054 | 4/1988 | Japan . | |
| 63-127871 | 8/1988 | Japan . | |
| 63-131350 | 8/1988 | Japan . | |
| 264174 | 6/1964 | Netherlands | 408/57 |

Primary Examiner—Daniel Howell
Attorney, Agent, or Firm—Oliff & Berridge

[57] ABSTRACT

An arbor for mounting a tool such as a drill or a grindstone to the end of a spindle of a machine tool and a machining method of employing such arbor. The arbor comprises a lubricant receiving member provided in the main body for receiving a lubricant supplied, and a lubricant passageway provided in the main body and extending between the lubricant receiving member and the tool mounting portion for flowing the lubricant from the lubricant receiving member to the tool mounting portion so as to supply the lubricant into an interior of the tool. The lubricant supplied from the spindle or another source of supply is allowed to flow through the lubricant receiving member and the lubricant passageway, and is supplied into an interior of the tool to ensure the appropriate supply of the lubricant to the area in which the tool acts upon the workpiece.

5 Claims, 6 Drawing Sheets

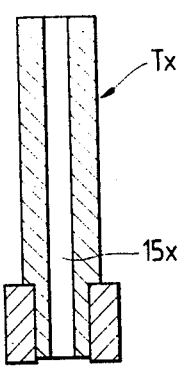
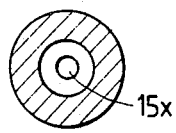
FIG.7(a)
FIG.7(d)
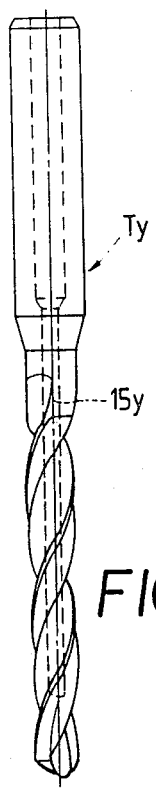
FIG.7(b)
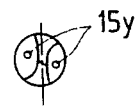
FIG.7(e)
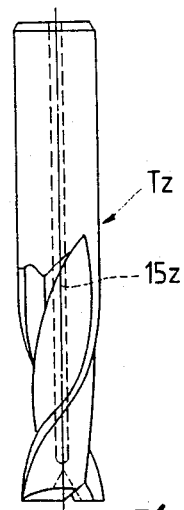
FIG.7(c)
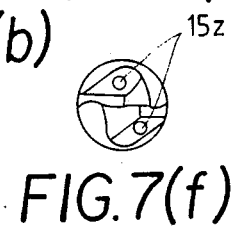
FIG.7(f)

FIG. 8
PRIOR ART
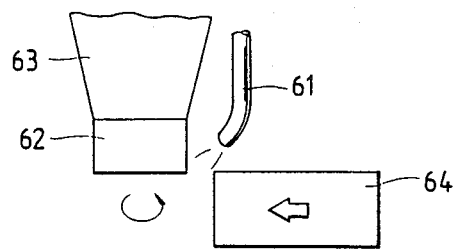
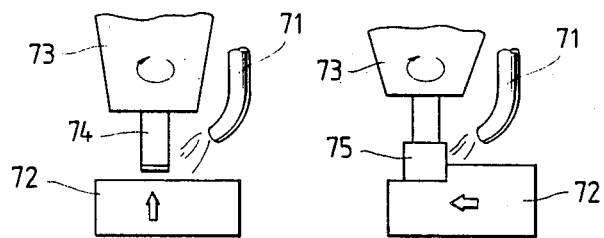
FIG. 9(a)  FIG. 9(b)
PRIOR ART
FIG. 10
PRIOR ART
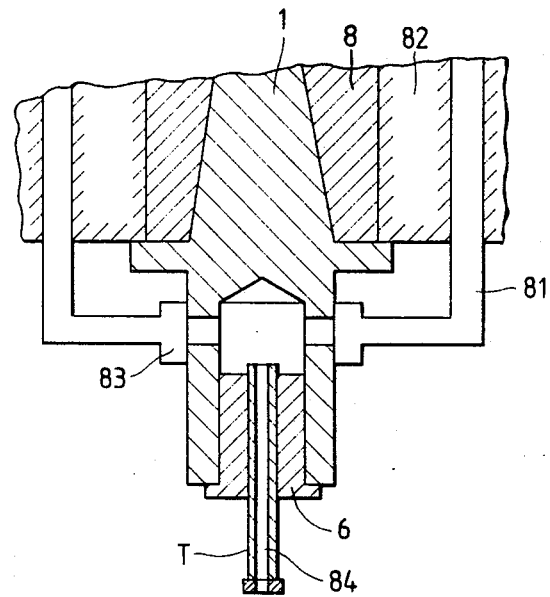

ARBOR FOR MOUNTING A TOOL TO A SPINDLE OF A MACHINE TOOL AND A MACHINING METHOD OF EMPLOYING THE SAME

BACKGROUND OF THE INVENTION

The present invention relates to an arbor for mounting a tool to a spindle of a machine tool and a machining method of employing the same, and more particularly to an arbor for mounting a tool such as a drill or a grindstone to the end of a spindle of a machine tool and a machining method of employing such arbor.

In performing various cutting or grinding operations on workpiece, it is necessary to ensure the appropriate supply of a lubricant such as cutting fluid or grinding fluid to an area of machining to lubricate the tool and the workpiece and prevent seizure and wear of the tool as well as the removal by the lubricant of any chips resulting from such machining.

When, for example, a cup-shaped grindstone is used for a face grinding, it is essential to ensure the appropriate supply of a grinding fluid or lubricant to the area in which a considerably large amount of heat is generated, as the grindstone and the workpiece to be ground have a long arc of contact therebetween. No device or method that is satisfactory for that purpose has, however, been available as yet. According to the practice which has hitherto been performed, a cup-shaped grindstone 62 mounted to the end of a spindle 63 and the workpiece 64 are moved relative to each other and a lubricant is supplied thereto bY an external nozzle 61, as shown in FIG. 8. It has, however, been difficult to ensure the appropriate supply of the lubricant, as it is prevented by, for example, a layer of moving air which is formed by the rotatiOn Of the cup-shaped grindstone 62. The formation of a lubricant passageway in the head for the grindstone has, however, been a complicated work because of the limited space which it can afford. Moreover, in order to maintain the strength of the grindstone, the grindstone has certain limitations on its shape. The provision of any such passageway has, therefore, been possible only at a very high cost.

Other problems that have hitherto been encountered include the scattering of the lubricant from anY such passageway which occurs when the tool is removed from the tool mounting portion of the spindle.

On the other hand, when, for example, a drilling is performed by a core drill 74 as shown in FIG. 9(a), or a work of forming a groove is performed by a grindstone 75 attached to a shaft as shown in FIG. 9(b), it has been usually carried out by rotating the core drill 74 or the grindstone 75 supported on an arbor 73 fitted in a spindle, while supplying a lubricant from an external nozzle 71 to that part of a workpiece 72 which is worked on.

Other prior art includes an arrangement as shown in FIG. 10. A lubricant is supplied through a lubricant supply passage 81 formed in the housing 82 of a machine tool and a rotary joint 83 into an arbor 1 fitted in a spindle. The lubricant is supplied from the arbor 1 to a lubricant passage 84 in a tool T, and is discharged through the end of the tool T. In FIG. 10, reference numeral 8 denotes the spindle, and 6 denotes a collet.

According to the arrangement in which the external nozzle 71 is employed for supplying the lubricant from the outside of the core drill 74 or the grindstone 75, it has been impossible to achieve an effective supply of the lubricant to the area of machining, since the rotation of the core drill 74 or the grindstone 75 causes the scattering of the lubricant and the resultant layer of moving air prevents the appropriate supply of the lubricant.

According to the latter arrangement including the rotary joint 83, the lubricant is supplied from the lubricant supply passage 81 in the housing 82 which is not rotatable, to the arbor 1 through the rotary joint 83, and the lubricant is, therefore, not supplied to the tool T satisfactorily if the rotating speed of the tool T is increased. Accordingly, the tool T has only a limited rotating speed.

SUMMARY OF THE INVENTION

In view of the aforesaid drawbacks of the conventional device or method, it is therefore, an object of the present invention to provide an arbor which can mount a tool on a spindle in such a way as to ensure the appropriate supply of a lubricant to the area in which the tool acts upon the workpiece to be worked, and thereby making it possible to achieve improved working efficiency and accuracy, to reduce the wear of the tool and to prevent the workpiece from damaging.

Another object of the present invention is to provide a machining method which employs such arbor.

In order to achieve the foregoing and other objects, there is provided in accordance with one aspect of the present invention an arbor for mounting a tool to a spindle of a machine tool, the arbor including a tool mounting portion for mounting the tool, a tapered portion which is removably fitted in the spindle, and a main body located between the tool mounting portion and the tapered portion, the arbor comprising: a lubricant receiving member provided in the main body for receiving a lubricant supplied; a lubricant passageway provided in the main body and extending between the lubricant receiving member and the tool mounting portion for flowing the lubricant from the lubricant receiving member to the tool mounting portion so as to supply the lubricant into an interior of the tool.

With the present invention, the lubricant supplied from the spindle or another source of supply is allowed to flow through the lubricant receiving member and the lubricant passageway, and is supplied into an interior of the tool to ensure the appropriate supply of the lubricant to the area in which the tool acts upon the workpiece.

According to another aspect of the present invention, there is also provided a machining method of employing the arbor for mounting a tool to a spindle of a machine tool, the arbor including a tool mounting portion for mounting the tool, a tapered portion which is removably fitted in the spindle, and a main body located between the tool mounting portion and the tapered portion, the method comprising the step of: preparing the arbor comprising a lubricant receiving member provided in the main body for receiving a lubricant supplied, and a lubricant passageway provided in the main body and extending between the lubricant receiving member and the tool mounting portion for flowing the lubricant from the lubricant receiving member to the tool mounting portion so as to supply the lubricant into an interior of the tool; supplying the lubricant into the lubricant receiving member, the lubricant having a pressure higher than atmospheric pressure.

BRIEF DESCRIPTION OF THE DRAWINGS

In the drawings:

FIG. I is a cross sectional view of an arbor for mounting a tool to a spindle of a machine tool according to a first embodiment of the present invention;

FIG. 7(a) to 7(f) show tools which can be used with the arbor of the present invention, FIG. 7(a) and 7(d) being the longitudinal sectional and bottom plan views of one of those tools, while FIGS. 7(b), 7(e) and 7(c), 7(f) are the front elevational and bottom plan views of the other tools, respectively;

FIG. 8 is a view showing a conventional face grinding method;

FIGS. 9(a) and 9(b) are views illustrating a conventional drilling method and a conventional method of forming a groove, respectively; and, FIG. 10 is a cross sectional view of a conventional arbor for mounting a tool to a spindle.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

An arbor for mounting a tool to a spindle according to a first embodiment of the present invention will now be described with reference to FIGS. 1 through 3.

Figure 1:
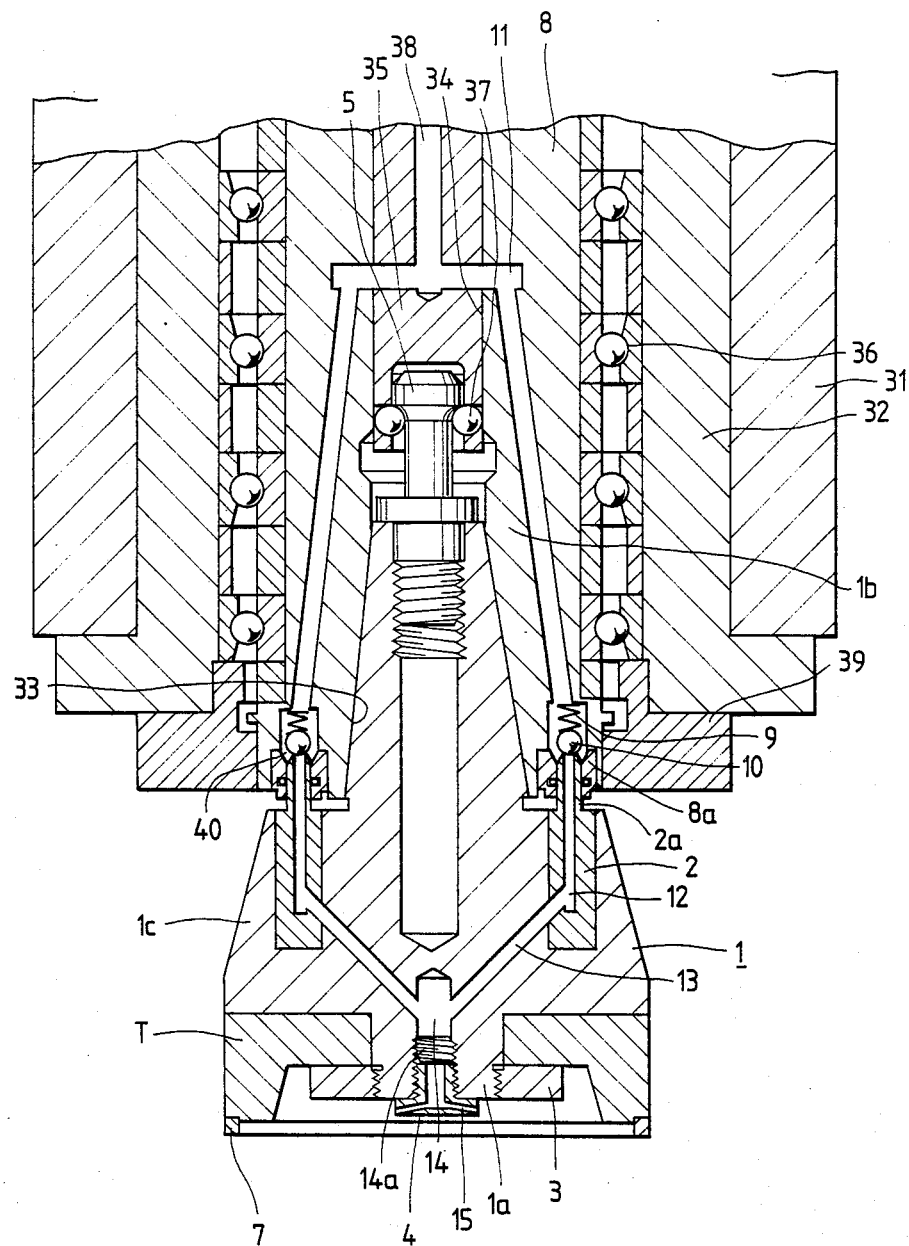

In FIG. 1, a substantially cylindrical housing 32 is fixedly provided in a head stock 31. A bearing train 36 consisting of four angular ball bearings is disposed in the housing 32 and the outer surface of each bearing is secured to the inner surface of the housing 32. A spindle 8 is rotatably supported on the housing 32 through the bearing train 36. An annular plate 39 is secured to the front end surface of the housing 32 and forms a labyrinth packing between the spindle 8 and the housing 32 to prevent any foreign matter from entering the interior of the housing 32.

The spindle 8 is provided with a tapered hole 33 extending in a longitudinal direction from the front end surface thereof. A tapered portion 1b of an arbor 1 is inserted in the tapered hole 33 and fitted in intimate contact with the tapered surface of the hole 33. The spindle 8 has an inner peripheral surface 34 which is contiguous to the tapered hole 33, and a draw bar (not shown) forming an internal part of a collet 35 is axially slidably inserted in the inner peripheral surface 34. A plurality of balls 37 are provided on the collet 35 for holding, drawing and clamping a tool pull stud 5 when the collet 35 is moved upwardly as viewed in FIG. 1.

A lubricant passageway 38 is formed in the collet 35 and is connected to a first lubricant passageway 11 provided in the spindle 8. The first lubricant passageway 11 has a front end connected to a plurality of lubricant supplying passageways 40 provided in the front end of the spindle 8. A ball 10 defining a sealing valve member is disposed in each lubricant supplying passageway 40. Each passageway 40 is provided adjacent to the front end of the spindle with an outlet member 8a having a hole and a tapered wall surface, and the ball 10 is urged against the tapered wall surface by a spring 9 to prevent any lubricant from flowing out of the passageway 40.

The arbor 1 has a main body 1c to which a plurality of lubricant receiving members 2 each having a projection 2a are secured. Each lubricant receiving member 2 is provided therethrough with a second lubricant passageway 12 connected with one of the lubricant passageways 40.

When the projection 2a of each lubricant receiving member 2 is inserted into the corresponding lubricant passageway 40, the projection 2a pushes up the ball 10 by overcoming the urging force of the spring 9, whereupon the passageway 40 is connected to the corresponding second lubricant passageway 12.

The arbor 1 is further provided with a plurality of third lubricant passageways 13 each connected to one of the second lubricant passageways 12. The arbor has a tool mounting portion 1a projecting from its front end and provided therethrough with a fourth lubricant passaseway 14 to which the third lubricant passageways 13 are connected. The fourth lubricant passageway 14 has a front end portion defined by a wall having a female screw thread 14a. A removable nozzle member 4 is threadedly engaged with the screw thread 14a and has orifices 15 which are connected with the fourth lubricant passageway 14 for discharging the lubricant. A cup-shaped tool T having a grindstone layer 7 is fitted about the tool mounting portion 1a and is secured thereto by a clamping nut 3.

The nozzle member 4 is replaced with another nozzle member of which the orifices 15 suit the shape and size of the cup-shaped tool T fitted on the arbor 1.

Operation of the arbor thus constructed will be described below.

The lubricant which has been introduced through the lubricant passageway 38 in the collet 35 is supplied to the arbor 1 through the first lubricant passageway 11 and the lubricant supplying passageways 40 in the spindle 8 and is directed to the nozzle member 4 through the second, third and fourth lubricant passageways 12, 13 and 14. The lubricant ejected from the orifices 15 is delivered through the inside of the cup-shaped tool T to the edge of the grindstone layer 7, i.e. the area in which the tool works.

Face grinding tests were conducted under the following conditions to ascertain the effectiveness of the apparatus as hereinabove described:

Tool: 50 mm dia. 60CBN resinoid bonded cup-shaped grindstone;
Workpiece to be ground: SKH-9 (750 Hv);
Peripheral speed of grindstone: 1000 m/min.;
Feed speed: 300 mm/min.;
Grinding depth: 0.15 mm;
Lubricant: Water-soluble grinding lubricant.

The tests were conducted to examine the state of the workpiece to be ground, grinding accuracy and the grinding ratio indicating the degree of wear of the grindstone [volume of the material removed from the workpiece by grinding (cc)/worn volume of the grindstone (cc)]by varying the pressure of the internally supplied lubricant which was supplied through the nozzle member 4, from 0 MPa (i.e. no lubricant was supplied) to 3.4 MPa, while the lubricant was constantly supplied at a rate of 22 liters per minute by an external lubricant supplying nozzle member 61 as shown in FIG. 8.

Figure 2:
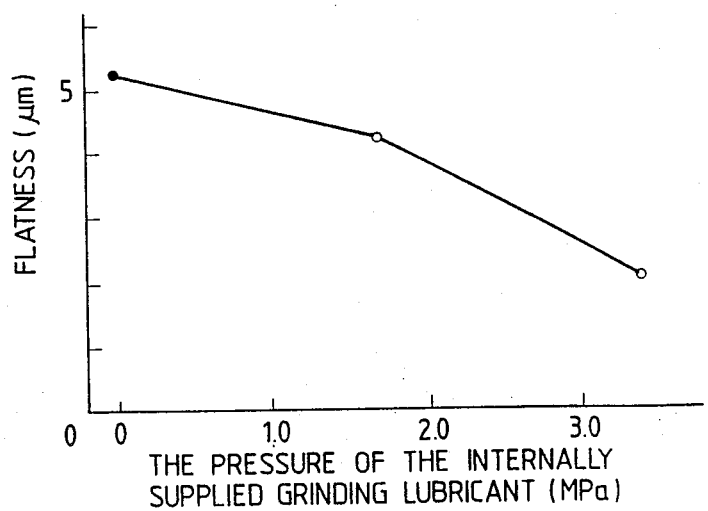
FIG. 2 is a graph showing grinding accuracy (flatness) in relation to the pressure of the internally supplied grinding lubricant.
Figure 3:
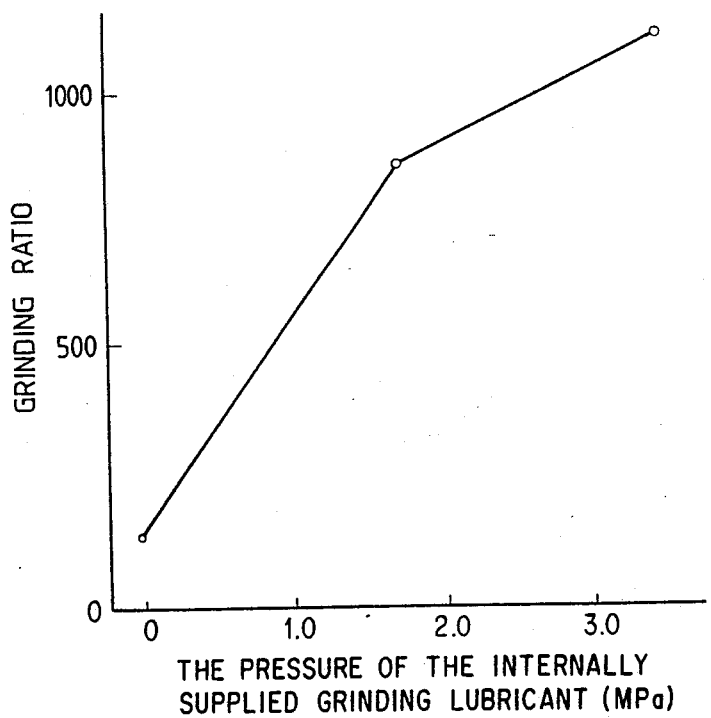
FIG. 3 is a graph showing a grinding ratio in relation to the pressure of the internally supplied grinding lubricant.

The results are shown in FIG. 2 and 3 which are graphs showing the grinding accuracy and the grinding ratio, respectively, in relation to the pressure of the internally supplied lubricant. In each graph, the black circle represents the workpiece which changed its color due to a high working temperature, and each white circle represents the workpiece which showed a normal appearance.

As is obvious from FIG. 2 and 3, the workpiece which had been ground without any internal supply of the lubricant showed a change of color and was greatly inferior in grinding accuracy and ratio to the workpiece which had been ground, while the lubricant was supplied internally.

Although a higher pressure at which the lubricant is internally supplied can be considered to produce better results, the tests have confirmed that a pressure of 1.7 to 3.4 MPa is sufficient for achieving increased grinding accuracy and longer grindstone life. The test results show that the apparatus ensures the very effective supply of the lubricant from the inside of the cup-shaped tool T to the edge of the grindstone layer 7, i.e. the area in which the tool works, and thereby to prevent working temperature from rising and remove chips from the workpiece very effectively.

The nozzle member 4 being removably attached to the arbor 1 makes it possible to use the nozzle member which is best suited for the shape and size of the cup-shaped tool T, and to thereby ensure that a good grinding working is always performed.

Although the lubricant has been described as being supplied through the spindle, it is also possible to cause the arbor to receive the lubricant through another route outside the spindle.

Figure 4:
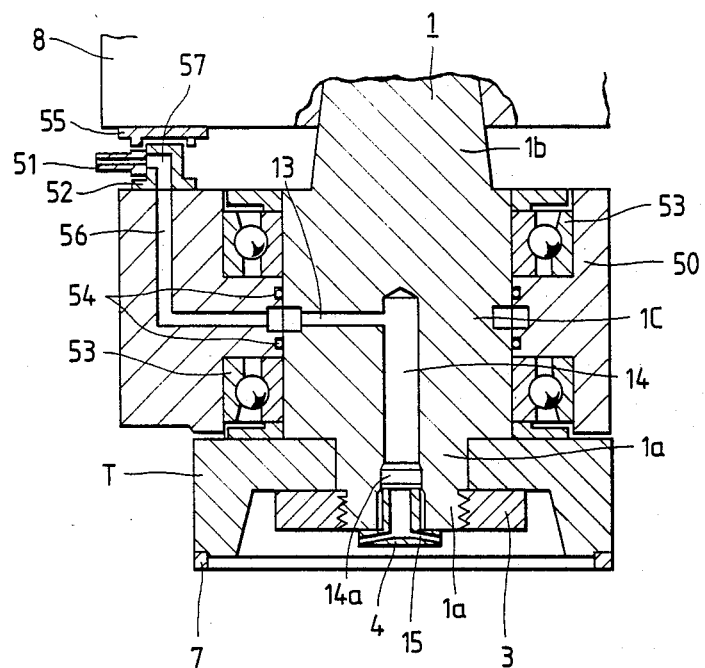
FIG. 4 is a cross sectional view showing a modification of the first embodiment of the present invention.

FIG. 4 shows a modification of the arbor in FIG. 1.

Those parts shown in FIG. 4 which are structurally and functionally identical to those shown in FIG. 1 are denoted at identical reference numerals, and will not be described in detail.

Two sets of bearings 53 are provided about the main body Ic of the arbor and the main body Ic of the arbor is rotatably supported on a housing 50 through bearings 53. Two oil sealing members 54 are provided between the bearings 53 for preventing the leakage of any lubricant. The housing 50 is provided at one end thereof with a positioning valve 52 which holds the housing 50 against rotation when the main body Ic of the arbor is rotating. The valve 52 is in confrontation with a positioning block 55 provided at the front end of the spindle. The positioning valve 52 is provided with a lubricant receiving member 51 which is connected to a lubricant passageway 57 in the positioning valve, and the passageway 57 is connected to a lubricant passageway 56 in the housing, and the passageway 56 to a third lubricant passageway 13 in the main body Ic of the arbor. The arbor 1 is of the same construction as the arbor shown in FIG. 1.

Operation of the arbor thus constructed will be described below.

The lubricant which has been introduced into the lubricant receiving member 51 is directed to the third lubricant passageway 13 in the main body Ic of the arbor through the lubricant passageway 57 in the positioning valve and the lubricant passageway 56 in the housing. And, the lubricant is directed to the nozzle member 4 through the fourth lubricant passageway 14. The lubricant ejected from the orifices 15 is delivered to the edge of the grindstone layer 7.

As is obvious from the foregoing description, this embodiment ensures the appropriate supply of the lubricant from the inside of a cup-shaped tool, etc. to the area in which the tool acts upon the workpiece to be worked, and thereby making it possible to improve the working efficiency and accuracy of the tool, to reduce its wear and to prevent the workpiece from damaging.

The positioning of the nozzle member in the center of the end of the boss portion makes it possible to supply the lubricant uniformly to the area in which the tool acts upon the workpiece, and to thereby achieve an improved working efficiency.

As the liquid receiving members include the projections extending from the main body and fitted in the lubricant supplying passageways of the spindle, there is no necessity of employing any special device for supplying the lubricant.

According to modified embodiment, the lubricant passageway in the main body opens in its outer peripheral surface and is connected to the lubricant passageway in the lubricant supplying member fitted about the outer peripheral surface of the main body in such a way that the lubricant supplying member and the main body may be rotatable relative to each other. This arrangement eliminates the necessity of forming any lubricant passageway in the spindle.

As the lubricant supplying passageways are connected to the liquid receiving members when the arbor is fitted in the tool mounting portion, but are closed when the arbor is removed therefrom, the removal of the arbor does not result in any leakage of the lubricant, therefore the fact that the arbor is removable without causing any lubricant leakage makes it easier to change the tool.

An arbor for mounting a tool to a spindle according to a second embodiment of the present invention will be described below with reference to FIGS. 5 through 7.

Figure 5:
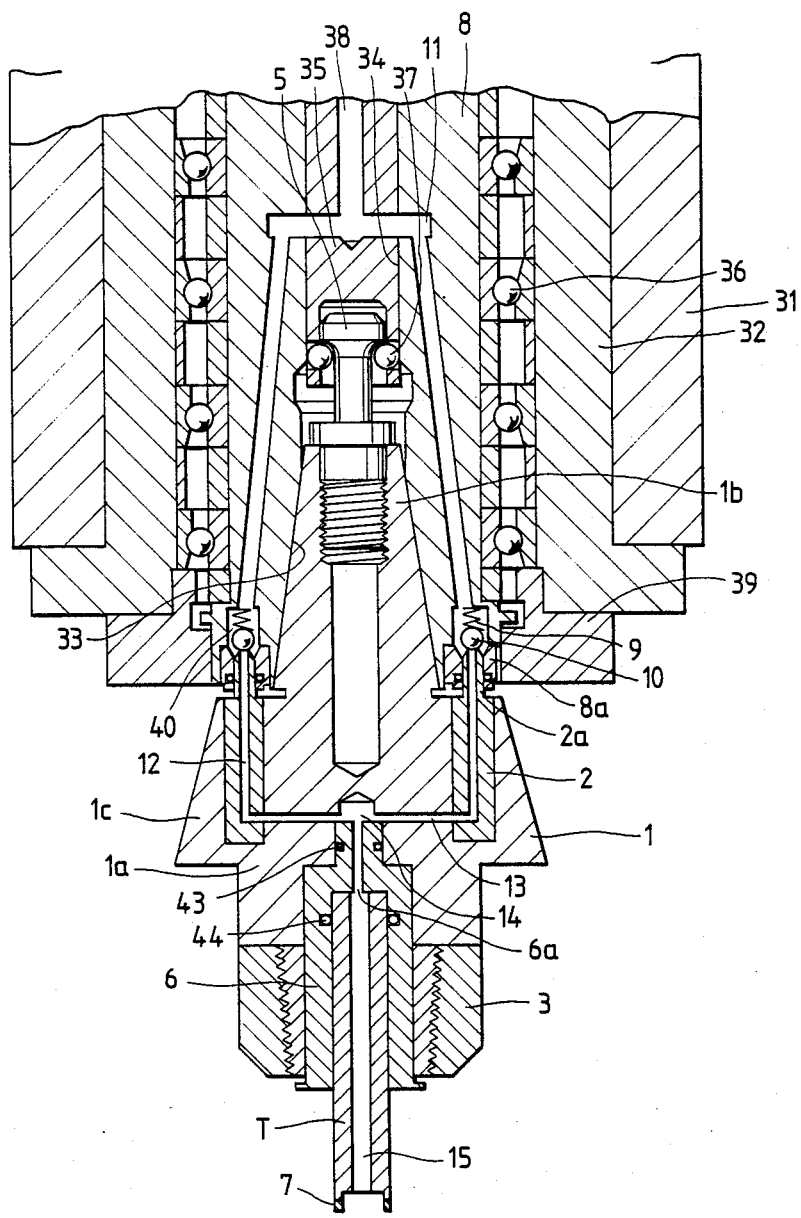
FIG. 5 is a cross sectional view of an arbor for mounting a tool to a spindle of a machine tool according to a second embodiment of the present invention.

Those parts shown in FIG. 5 which are structurally and functionally identical to those shown in FIG. 1 are denoted at identical reference numerals, and will not be described in detail.

The arbor 1 is provided with a first and second lubricant supply passages 11, 12 in the same as the arbor of the first embodiment.

The arbor 1 is radially provided with third lubricant supply passage 13 which are connected to the second lubricant supply passages 12, respectively. The arbor 1 is also provided in its tool mounting portion 1*i* with a fourth lubricant supply passage 14 connected to the third lubricant supply passages 13. A collet 6 is fitted with the fourth lubricant supply passage 14. The collet 6 is provided therethrough with a lubricant supply passage 6*a* connected to the fourth lubricant supply passage 14. A tool (more specifically, a core drill) T having a grindstone layer 7 at its end is held in the collet 6 and is mounted on the tool mounting portion 1*a*. The arbor 1 has a clamping nut 3 which is meshingly engaged to cause the collet 6 to clamp the tool T and hold it in position. The tool T has an axially extending lubricant passage hole 15 having one end which opens at the front end of the tool T.

An 0-ring 43 is disposed between the contacting surfaces of the arbor 1 and the collet 6 and another 0-ring 44 is disposed between the contacting surfaces of the collet 6 and the tool T.

Operation of the arbor thus constructed will be described below.

The lubricant is supplied from the lubricant supply passage 38 in the collet 35 to the arbor 1 through the first lubricant supply passage 11 and the lubricant supply ports 40 in the spindle 8 and flows through the second, third and fourth lubricant supply passages 12, 13 and 14 and the lubricant supply passage 6a in the collet 6, while any leakage thereof is prevented by the 0-ring 43. Then, the lubricant flows from the lubricant supply passage 6a to the lubricant passage hole 15 in the tool T, while any leakage thereof is prevented by the 0-ring 44, and the lubricant is discharged through the end of the tool T and supplied to that part of a workpiece which is worked on.

Drilling work was performed under the following conditions to ascertain the effectiveness of the apparatus which has hereinabove been described.
Tool: A 10 mm dia. diamond metal bonded core drill having a grindstone layer thickness of 1 mm (a grain size of 100 and a concentration of 100);
Workpiece: Silicon carbide;
Tool rotating speed: 4,000 rpm:
Step feed rate: 0.5 mm/cycle;
Lubricant: A water soluble grinding fluid.

The grinding operation was performed, while the lubricant was also supplied to that part of the workpiece which was being ground, at a rate of 22 liters per minute through an external nozzle 21 as shown in FIG. 9(a). The pressure of the lubricant which was discharged through the end of the tool T was varied between 0 MPa (i.e. no lubricant was supplied therethrough) and 2.5 MPa and in both of those cases, the grindstone layer 7 at the end of the tool T was examined for the machining ratio (ground depth/worn grindstone height).

Figure 6:
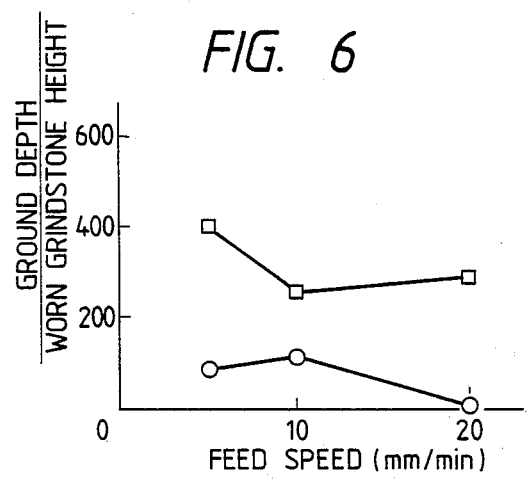
FIG. 6 is a graph showing the relation between the feed speed and the machining ratio which was obtained as the result of the tests conducted by employing the arbor shown in FIG. 5.

The results are shown in FIG. 6. FIG. 6 is a graph showing the machining ratio in relation to the feed speed. The circles show the results which were obtained when no lubricant had been supplied. When a feed speed of 20 mm/min was employed, the worn height of the grindstone layer 7 was substantially equal to the ground depth. The squares show the results which were obtained when the lubricant had been discharged at a pressure of 2.5 MPa. When a feed speed of 20 mm/min was employed, the grindstone layer 7 showed a drastic reduction in wear and yielded a machining ratio of about 300.

As an increase in the pressure at which the lubricant was discharged through the end of the tool T was considered to produce better results, tests were conducted by varying the pressure at which the lubricant was discharged therethrough. The tests confirmed that the use of a discharging pressure of about 1.7 to 3.4 MPa was sufficient to achieve drastic improvements in grinding accuracy and grindstone life. This means that the arbor 1 ensures the sufficient supply of the lubricant to that part of the workpiece which is worked on, if the lubricant which is internally supplied through the end of the tool T is discharged at a pressure higher than atmospheric pressure, and preferably in the range of about 1.7 to 3.4 Mpa. It is presumed that as a result, the temperature of the grindstone layer 7 at the end of the tool T is prevented from rising, while chips are smoothly removed.

Although the test results have been described by employing a core drill as the tool T, similar results can be expected from, for example, a work of forming a groove by employing a grindstone Tx supported on a shank and having a lubricant passage hole 15x as shown in FIG. 7(a), or by employing an end mill or like cutting tool Tz having a lubricant passage hole 15z as shown in FIG. 7(c), or a drilling work employing a drill, gun drill or like cutting tool Ty having a lubricant passage hole 15Y as shown in FIG. 7(b).

As is obvious from the foregoing description, this invention has the following advantages:

(1) Since the arbor is provided with the lubricant supply passages in its main body and collet, the arbor and the tool can be rotated with the spindle. The rotating speed of the tool is not limited, but can be increased without affecting the appropriate supply of the lubricant. The lubricant is effectively supplied from the end of the tool to that part of the workpiece on which the tool works. Therefore, the arbor contributes to improving the machining efficiency and the machining accuracy and enables a reduction in wear of the tool and a drastic prolongation of its life.

(2) In addition to the advantages as stated above, the arbor has the advantage that the 0-rings prevent any leakage of the lubricant and any drop in the pressure at which it is discharged.

(3) The machining method ensures the sufficient supply of the lubricant to that part of the workpiece which is worked on, thereby keeping the temperature of the end of the tool working on the workpiece from rising and enabling the smooth removal of chips, and realizing, therefore, drastic improvements in the machining accuracy and the life of the tool.

What is claimed is:

1. A machining apparatus for machining an object, comprising:
   a spindle having therein a first lubricant passageway having an outlet end for passing a lubricant therethrough;
   a cup-shaped tool having a grinding layer;
   an arbor detachably and exchangeably mounted on said spindle for mounting said cup-shaped tool to said spindle, said arbor including a tool mounting portion for detachably and exchangeably mounting said cup-shaped tool thereto, a tapered portion fitted removably in said spindle, and a main body located between said tool mounting portion and said tapered portion, wherein said main body includes a lubricant receiving member connectable to said outlet end of said first lubricant passageway for receiving the lubricant supplied through said first lubricant passageway and a second lubricant passageway extending between said lubricant receiving member and said tool mounting portion for conducting the lubricant from said lubricant receiving member to said tool mounting portion;
   a nozzle member detachably and exchangeably provided at the center portion of said tool mounting portion for receiving the lubricant supplied through said second lubricant passageway and radially ejecting the lubricant to the edge of said grinding layer; and
   sealing means provided in said first lubricant passageway for sealing the outlet end of said first lubricant passageway, said sealing means preventing the lubricant from leaking out of said first lubricant passageway when said arbor is not mounted to said spindle and allowing the lubricant to flow into said second lubricant passageway when said arbor is mounted on said spindle.

2. A machining apparatus as in claim 1, wherein said arbor further comprises a member for moving said sealing means is said first lubricant passageway to open the outlet end of said first lubricant passageway when said arbor is mounted on said spindle.

3. A machining apparatus as in claim 2, wherein said sealing means comprises a ball for closing the outlet end of said first lubricant passageway and means for biasing said ball to a closing position.

4. A machining apparatus as in claim 1, further comprising a clamping nut for detachably and exchangeably securing said cup-shaped tool to said tool mounting portion.

5. A method for machining an object with a machining apparatus comprising a spindle having therein a first lubricant passageway having an outlet end for passing a lubricant therethrough, a cup-shaped tool having a grinding layer, an arbor detachably and exchangeably mounted to the spindle for mounting the cup-shaped tool to the spindle, the arbor including a tool mounting portion for detachably and exchangeably mounting the cup-shaped tool thereto, a tapered portion fitted removably in the spindle, and a main body located between the tool mounting portion and the tapered portion and including a lubricant receiving member connectable to the outlet end of the first lubricant passageway for receiving the lubricant supplied through the first lubricant passageway and second lubricant passageway extending between the lubricant receiving member and the tool mounting portion for conducting the lubricant from the lubricant receiving member to the tool mounting portion, a nozzle member detachably and exchangeably provided at the center portion of the tool mounting portion for receiving the lubricant supplied through the second lubricant passageway and radially ejecting the lubricant to the edge of the grinding layer, and sealing means provided in the first lubricant passageway for sealing the outlet end of the first lubricant passageway, comprising the step of:

mounting the arbor on the spindle for allowing the first lubricant passageway to be communicated with the second lubricant passageway;

releasing the sealing of the outlet end of the first lubricant passageway; and machining an object while the lubricant is supplied from the first lubricant passageway, the lubricant receiving member, the second lubricant passageway, the tool mounting portion and the nozzle to the grinding layer of the cupshaped tool.

* * * * *